(12) United States Patent
Kobayashi et al.

(10) Patent No.: US 12,018,659 B1
(45) Date of Patent: Jun. 25, 2024

(54) POWER GENERATION DEVICE

(71) Applicant: TOYOTA JIDOSHA KABUSHIKI KAISHA, Toyota (JP)

(72) Inventors: Kunihiro Kobayashi, Toyota (JP); Eiji Ito, Susono (JP); Sou Morishita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/389,983

(22) Filed: Dec. 20, 2023

(30) Foreign Application Priority Data

Jan. 19, 2023 (JP) ................. 2023-006650

(51) Int. Cl.
   *F03D 9/25* (2016.01)
   *F16H 48/06* (2006.01)
   *F16H 48/38* (2012.01)

(52) U.S. Cl.
   CPC ............ *F03D 9/25* (2016.05); *F16H 48/06* (2013.01); *F16H 48/38* (2013.01); *F05B 2220/30* (2013.01); *F05B 2220/706* (2013.01); *F05B 2260/40* (2013.01)

(58) Field of Classification Search
   CPC . F03D 9/25; F16H 48/06; F16H 48/38; F05B 2220/30; F05B 2220/706; F05B 2260/40
   See application file for complete search history.

(56) References Cited

U.S. PATENT DOCUMENTS

| | | | | |
|---|---|---|---|---|
| 4,556,801 A | * | 12/1985 | Gervasio | ............... F03D 9/25 416/DIG. 4 |
| 2011/0206517 A1 | * | 8/2011 | Antonov | ............ F16H 37/0833 74/473.1 |

FOREIGN PATENT DOCUMENTS

| | | | |
|---|---|---|---|
| CN | 114382652 A | * | 4/2022 |
| JP | H10-061748 A | | 3/1998 |
| JP | 2011-190844 A | | 9/2011 |

* cited by examiner

*Primary Examiner* — Audrey B. Walter
(74) *Attorney, Agent, or Firm* — Oliff PLC (57) ABSTRACT

A power generation device may include: a blade; a first rotation shaft; a differential gear mechanism; and a first motor generator. The differential gear mechanism may include: a pair of a first side gear and a second side gear; and a first ring gear connecting the first side gear and the second side gear to the first motor generator. The first side gear may be fixed to one end of the first rotation shaft, and the blade is connected to the other end of the first rotation shaft. In the differential gear mechanism, at least two of the first side gear, the second side gear and the first ring gear may be fixed to each other such that they are not able to rotate relative to each other.

5 Claims, 6 Drawing Sheets

POWER GENERATION DEVICE

REFERENCE TO RELATED APPLICATIONS

This application claims priority to Japanese Patent Application No. 2023-006650 filed on Jan. 19, 2023, the entire contents of which are incorporated herein by reference.

BACKGROUND ART

The technology disclosed herein relates to a power generation device.

Japanese Patent Application Publication No. 2011190844 describes a power generation device including a gear as a speed increaser.

DESCRIPTION

A vehicle transaxle includes a motor generator and a differential gear mechanism that offsets a difference in rotation speed between a pair of axles. Here, a case where a blade is placed on one of the pair of axles of the vehicle transaxle to generate electricity with the motor generator is considered. In this case, since a driving force is inputted only from one axle, the other axle slips. As a result, the driving force inputted from the one axle is not transmitted to the motor generator. As a result, there is a problem that electric power cannot be generated.

The technique disclosed herein is embodied as a power generation device. This power generation device may comprise: a blade; a first rotation shaft; a differential gear mechanism; and a first motor generator. The differential gear mechanism may comprise: a pair of a first side gear and a second side gear; and a first ring gear connecting the first side gear and the second side gear to the first motor generator. The first side gear may be fixed to one end of the first rotation shaft. The blade may be connected to the other end of the first rotation shaft. In the differential gear mechanism, at least two of the first side gear, the second side gear and the first ring gear are fixed to each other such that they are not able to rotate relative to each other.

An aspect of the power generation device herein is not particularly limited as long as it is a device configured to generate electric power by rotating a blade. The power generation device herein is not limited to a wind power generation device, but may be, for example, a hydroelectric power generation device. It is also not limited to a horizontal axis power generation device, but may be, for example, a vertical axis power generation device. According to the power generation device described above, it is possible to integrally rotate the first ring gear and the first rotation shaft. The driving force inputted to the first rotation shaft by the blade can be properly transmitted to the first motor generator. It is possible to generate electric power in the power generation device comprising the differential gear mechanism on the power transmission path.

DETAILED DESCRIPTION

In one embodiment of the present technique, the differential gear mechanism may comprise a plurality of pinion gears connecting the first side gear and the second side gear to each other. The differential gear mechanism may comprise a case integrated with the first ring gear, the case housing the first side gear, the second side gear, and the plurality of pinion gears. The first rotation shaft or the first side gear may be fixed to the case.

According to this configuration, the first rotation shaft can be fixed to the case. The driving force inputted to the first rotation shaft can be transmitted to the first motor generator.

In one embodiment of the present technique, the case may include a guide portion having a cylindrical shape coaxial with the first rotation shaft, the guide portion covering a circumference of the first rotation shaft. An inner wall surface of the guide portion facing the first rotation shaft may be fixed to the first rotation shaft.

According to this configuration, when the driving force is inputted to the first side gear, the second side gear can be prevented from slipping. As a result, it is possible to rotate the first rotation shaft and the case together.

In one embodiment of the present technique, the differential gear mechanism may comprise a plurality of pinion gears connecting the first side gear and the second side gear to each other. The differential gear mechanism may comprise a case integrated with the first ring gear, the case housing the first side gear, the second side gear, and the plurality of pinion gears. The second side gear may be fixed to the case.

According to this configuration, it is possible to rotate the first rotation shaft and the case together.

In one embodiment of the present technique, the power generation device may further comprise a planetary gear mechanism and a second motor generator. The planetary gear mechanism may comprise a sun gear, a second ring gear, and a planetary carrier. The first motor generator may be connected to the sun gear. The blade and the second motor generator may be connected to the second ring gear.

According to this configuration, a transaxle for a hybrid vehicle may be used as a part of the power generation device.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved power generation devices.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

First Embodiment

Configuration of Wind Power Generation Device 1

Figure 1:
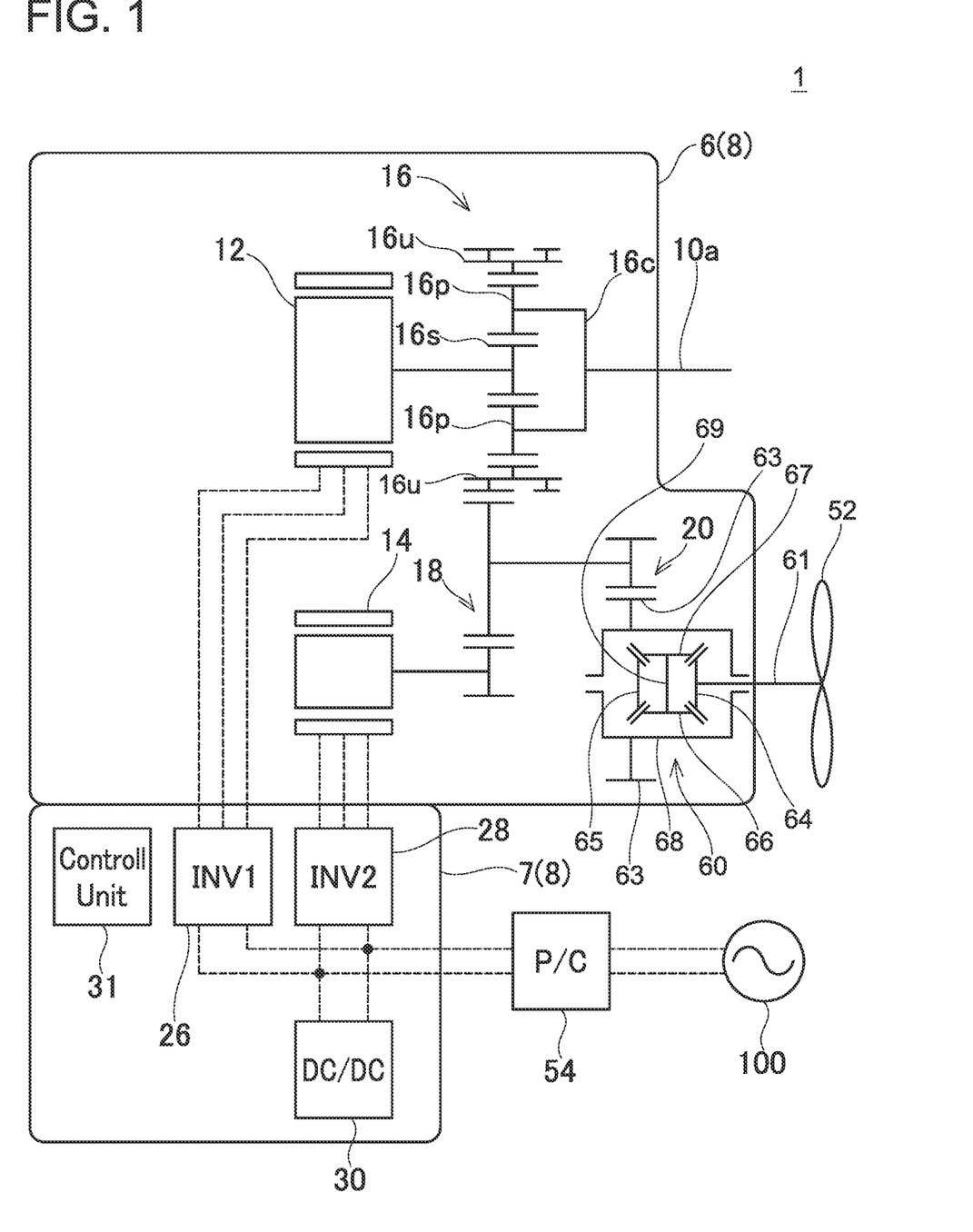
FIG. 1 is a schematic view of a wind power generation device 1.

Referring to FIG. 1, a wind power generation device 1 is described. The wind power generation device 1 mainly includes a hybrid unit 8, a blade 52, and a power conditioner 54.

First, the hybrid unit 8 will be described. As shown in FIG. 1, the hybrid unit 8 for a hybrid vehicle is used in the wind power generation device 1 of the present embodiment. The hybrid unit 8 is a power unit connected to wheels in the hybrid vehicle. The hybrid unit 8 mainly includes a transaxle 6 and a power control unit 7. The hybrid unit 8 may be new or used.

The transaxle 6 mainly includes a first motor generator 12, a second motor generator 14, a planetary gear mechanism 16, and a differential gear mechanism 60. The planetary gear mechanism 16 is positioned between an engine shaft 10a and the first motor generator 12. One end of the engine shaft 10a is connected to the first motor generator 12 via the planetary gear mechanism 16. Nothing is connected to the other end of the engine shaft 10a. The first motor generator 12 is a motor generator with a lower rated output and lower starting torque than the second motor generator 14.

The planetary gear mechanism 16 includes a sun gear 16s, a plurality of planetary gears 16p, a planetary carrier 16c, and a ring gear 16u. The sun gear 16s is connected to the first motor generator 12. The plurality of planetary gears 16p is arranged around the sun gear 16s and is engaged with the sun gear 16s. The planetary carrier 16c rotatably supports the plurality of planetary gears 16p and is connected to the engine shaft 10a. The ring gear 16u is positioned around the plurality of planetary gears 16p and is engaged with the plurality of planetary gears 16p. The ring gear 16u is connected to the second motor generator 14 via a first reduction mechanism 18. Further, the ring gear 16u is connected to the ring gear 63 of the differential gear mechanism 60 via a second reduction mechanism 20.

The differential gear mechanism 60 includes a first rotation shaft 61, a ring gear 63, a first side gear 64, a second side gear 65, pinion gears 66 and 67, a differential gear case 68, and a pinion shaft 69. The first rotation shaft 61 is an axle. The first side gear 64 is fixed to the inner end of the first rotation shaft 61. The blade 52 is connected to the outer end of the first rotation shaft 61. A speed reducer, a speed increaser, or a gearbox may be provided between the first rotation shaft 61 and the blade 52, as needed. Nothing is connected to the second side gear 65.

The pinion gears 66 and 67 are supported in the differential gear case 68 by the pinion shaft 69 such that they can self-rotate. The first side gear 64 and the second side gear 65 are meshed with the pinion gears 66 and 67. That is, the pinion gears 66 and 67 connect a pair of first and second side gears 64 and 65 to each other. The differential gear case 68 houses the first side gear 64 and the second side gear 65 and the pinion gears 66 and 67. The ring gear 63 is arranged on the outer periphery of the differential gear case 68. In other words, the differential gear case 68 is integrated with the ring gear 63. The ring gear 63 is a helical gear, and each tooth tip of the ring gear 63 has a torsional angle with respect to the first rotation shaft 61.

The power control unit 7 is integrated with respect to the transaxle 6. The power control unit 7 includes a first inverter 26, a second inverter 28, a DC-DC converter 30, and a control unit 31 for controlling them. The control unit 31 may be a power control unit (PCU). The first inverter 26 is electrically connected to the first motor generator 12. The second inverter 28 is electrically connected to the second motor generator 14.

The DC-DC converter 30 is electrically connected to the first motor generator 12 via the first inverter 26 and is electrically connected to the second motor generator 14 via the second inverter 28. Further, the power conditioner 54 is electrically connected to the power control unit 7. The power conditioner 54 is interposed between an external power system 100 and the power control unit 7. The electric power generated by the first motor generator 12 and the second motor generator 14 is supplied to the power conditioner 54 via the power control unit 7. The power conditioner 54 can supply the generated electric power to the external power system 100 by being grid-tied to the external power system 100.

As described above, the structure in which the first motor generator 12 is connected to the sun gear 16s and the second motor generator 14 and the blade 52 are connected to the ring gear 16u is realized. In such a structure, a ratio of a rotation speed of the second motor generator 14 to a rotation speed of the blade 52 is fixed. On the other hand, a ratio of a rotation speed of the first motor generator 12 to the rotation speed of the blade 52 is adjustable.

Features of Differential Gear Mechanism 60

The technique herein has the feature that, in the differential gear mechanism 60, at least two of the first side gear 64, the second side gear 65 and the ring gear 63 are fixed to each other such that they are not able to rotate relative to each other. The first embodiment describes the configuration in which the first rotation shaft 61 and the ring gear 63 are fixed to each other. This is described in detail below.

Figure 2:
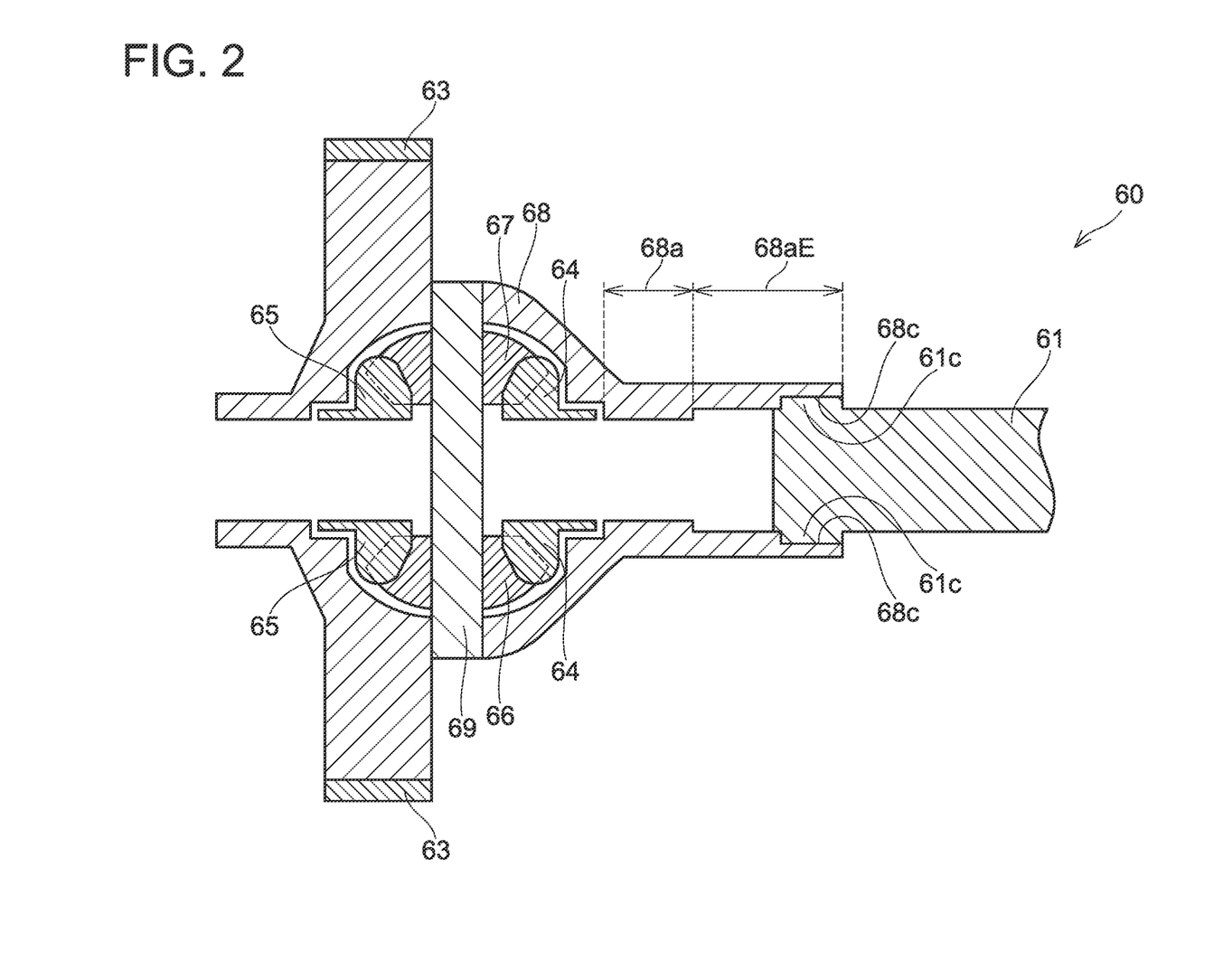
FIG. 2 is a cross-sectional schematic view of a differential gear mechanism 60 of a first embodiment.

FIG. 2 shows a cross-sectional schematic view of the differential gear mechanism 60 of the first embodiment. The differential gear mechanism 60 in FIG. 2 is a mechanism for a four-wheel vehicle. Accordingly, the differential gear case 68 includes a guide extension 68aE in addition to the guide portion 68a. The guide portion 68a and the guide extension 68aE are substantially cylindrical-shaped members into which the first rotation shaft 61 is inserted. In the guide extension 68aE, a fitting portion 68c is defined in the inner wall surface facing the first rotation shaft 61. The fitting portion 68c is a portion to which a transfer case (not shown) is fitted. A fitting portion 61c is formed at the end of the first rotation shaft 61. By the fitting portion 61c of the first rotation shaft 61 fitting to the fitting portion 68c of the guide extension 68aE, the first rotation shaft 61 and the differential gear case 68 can be fixed to each other. In other words, the first side gear 64 and the ring gear 63 can be fixed to each other. The fitting configuration between the fitting portion 61c and the fitting portion 68c is not particularly limited and may be different.

Effects

A problem will be described. The vehicle transaxle 6 includes the differential gear mechanism 60. Here, the case where power is generated by using the first motor generator 12 by placing the blade 52 on the first rotation shaft 61 is considered. In this case, since a driving force is inputted to the differential gear mechanism 60 only from the first rotation shaft 61, the second side gear 65 slips and the driving force inputted from the first rotation shaft 61 is not transmitted to the first motor generator 12. As a result, there is a problem that power cannot be generated. Therefore, in the wind power generation device 1 of the present embodiment, the first rotation shaft 61 and the ring gear 63 of the differential gear mechanism 60 are fixed to each other. Due to this, it is possible to rotate the first rotation shaft 61 and the ring gear 63 together. Because of the driving force inputted to the first rotation shaft 61, the second side gear 65 does not slip. The driving force inputted to the first rotation shaft 61 by the blade 52 can be properly transmitted to the first motor generator 12. It is possible to generate electricity in the wind power generation device 1 including the differential gear mechanism 60 on the power transmission path.

By using the fitting portion 68*c* included in the existing differential gear case 68 for a four-wheel drive vehicle, the first rotation shaft 61 can be fixed to the ring gear 63. Since there is no need to create a differential gear case dedicated for fixing the first rotation shaft 61, the manufacturing cost of the wind power generation device 1 can be reduced.

Variant of First Embodiment

Figure 3:
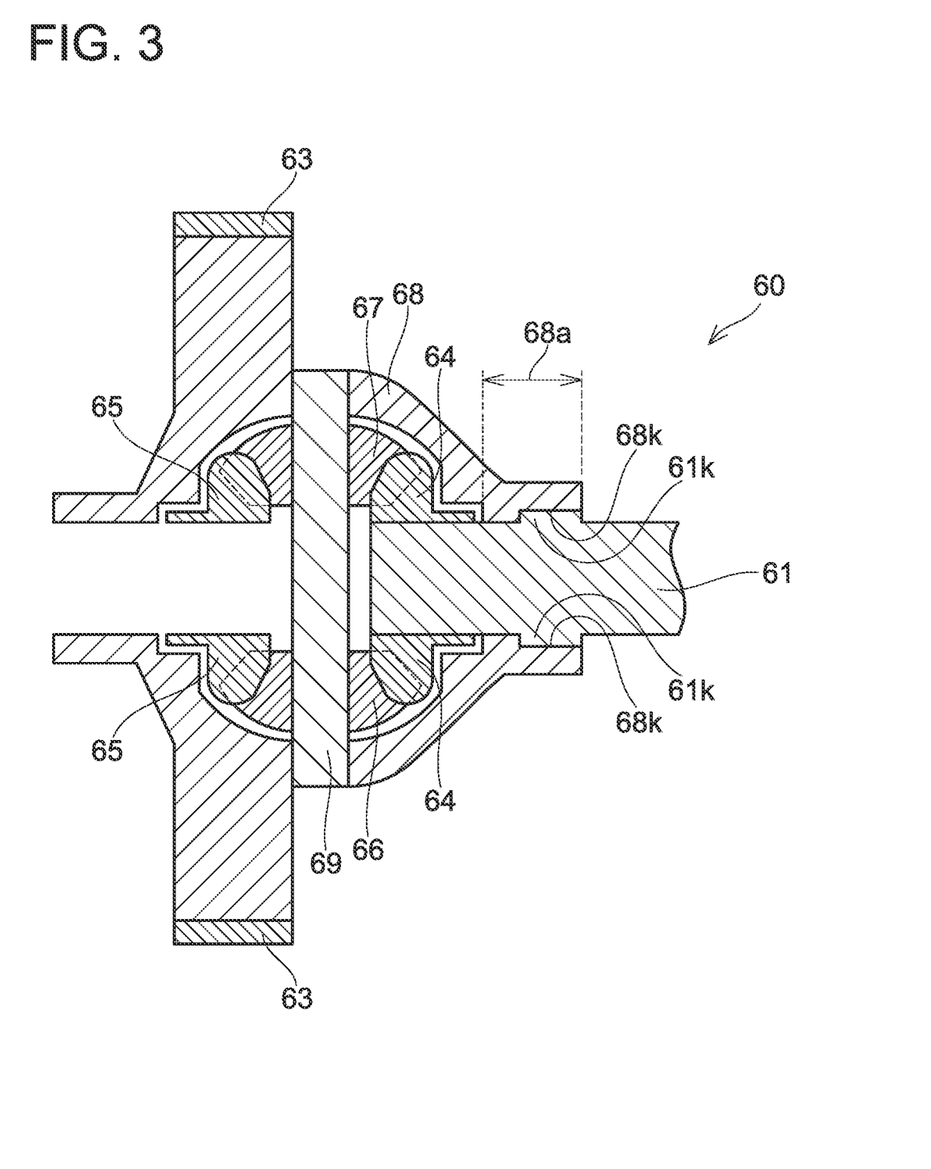
FIG. 3 is a cross-sectional schematic view of a differential gear mechanism 60 of a variant of the first embodiment.

How to fix the first rotation shaft 61 and the differential gear case 68 to each other may vary. For example, as shown in FIG. 3, a differential gear case 68 for two-wheel drive without a guide extension 68*a*E may be used. A key groove 68*k* is defined in the inner wall surface of the guide portion 68*a*. A key 61*k* is formed on the first rotation shaft 61. The key 61*k* fits into the key groove 68*k*, by which the first rotation shaft 61 and the differential gear case 68 can be fixed to each other.

The first rotation shaft 61 and the differential gear case 68 may be fixed by friction. In this case, a frictional fastener may be used. A frictional wedge fastener may also be used. In the wedge fastener, power is applied to a tapered ring in the axial direction, by which high frictional power can be generated by the principle of wedge mechanism.

Second Embodiment

Figure 4:
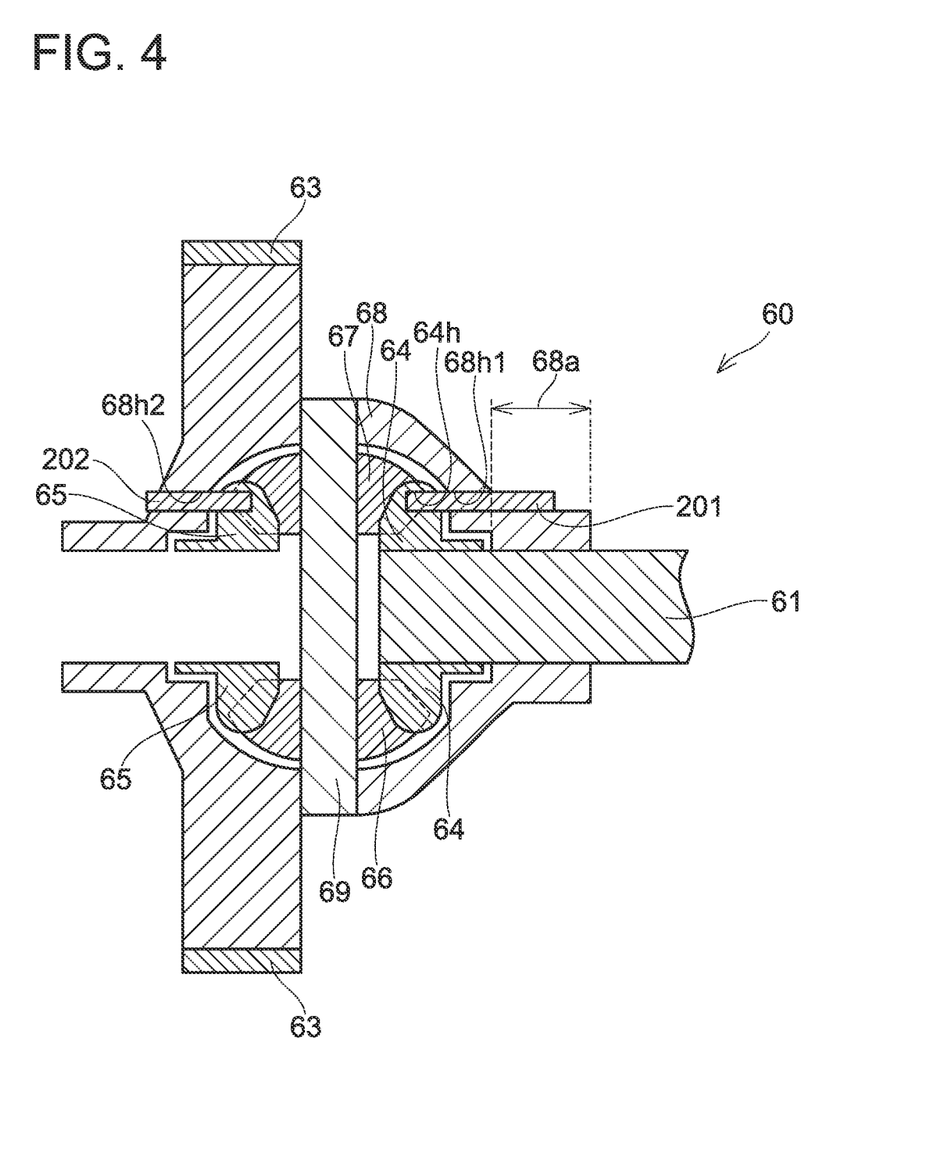
FIG. 4 is a cross-sectional schematic view of a differential gear mechanism 60 of a second embodiment.

In a second embodiment, a configuration in which the first side gear 64 and the ring gear 63 are fixed to each other in the differential gear mechanism 60 is described. FIG. 4 shows a schematic cross-sectional view of the differential gear mechanism 60 in the second embodiment. The same reference signs are given to parts identical to those in the first embodiment and explanations thereof are omitted. In addition, parts unique to the second embodiment are distinguished by giving them reference signs in the 200*s*.

In the second embodiment, the first side gear 64 is fixed to the differential gear case 68. How to fix the first side gear 64 to the differential gear case 68 may vary. In the example shown in FIG. 4, a knock pin 201 is used.

A specific explanation will be given. A through hole 68*h*1 is defined in the differential gear case 68. A hole 64*h* is defined in the first side gear 64 at a position corresponding to the through hole 68*h*1. The central axes of the through hole 68*h*1 and the hole 64*h* are parallel to the first rotation shaft 61. The knock pin 201 is driven into both of the through hole 68*h*l and the hole 64*h*. Due to this, the first side gear 64 can be fixed to the differential gear case 68. In other words, the first side gear 64 and the ring gear 63 can be fixed to each other. Due to this, it is possible to rotate the first rotation shaft 61 and the differential gear case 68 together.

In the same manner, the second side gear 65 is also fixed to the differential gear case 68. Specifically, a knock pin 202 is driven into both a through hole 68*h*2 defined in the differential gear case 68 and a hole 65*h* defined in the second side gear 65. Due to this, it is ensured that the second side gear 65 can be prevented from slipping.

Third Embodiment

Figure 5:
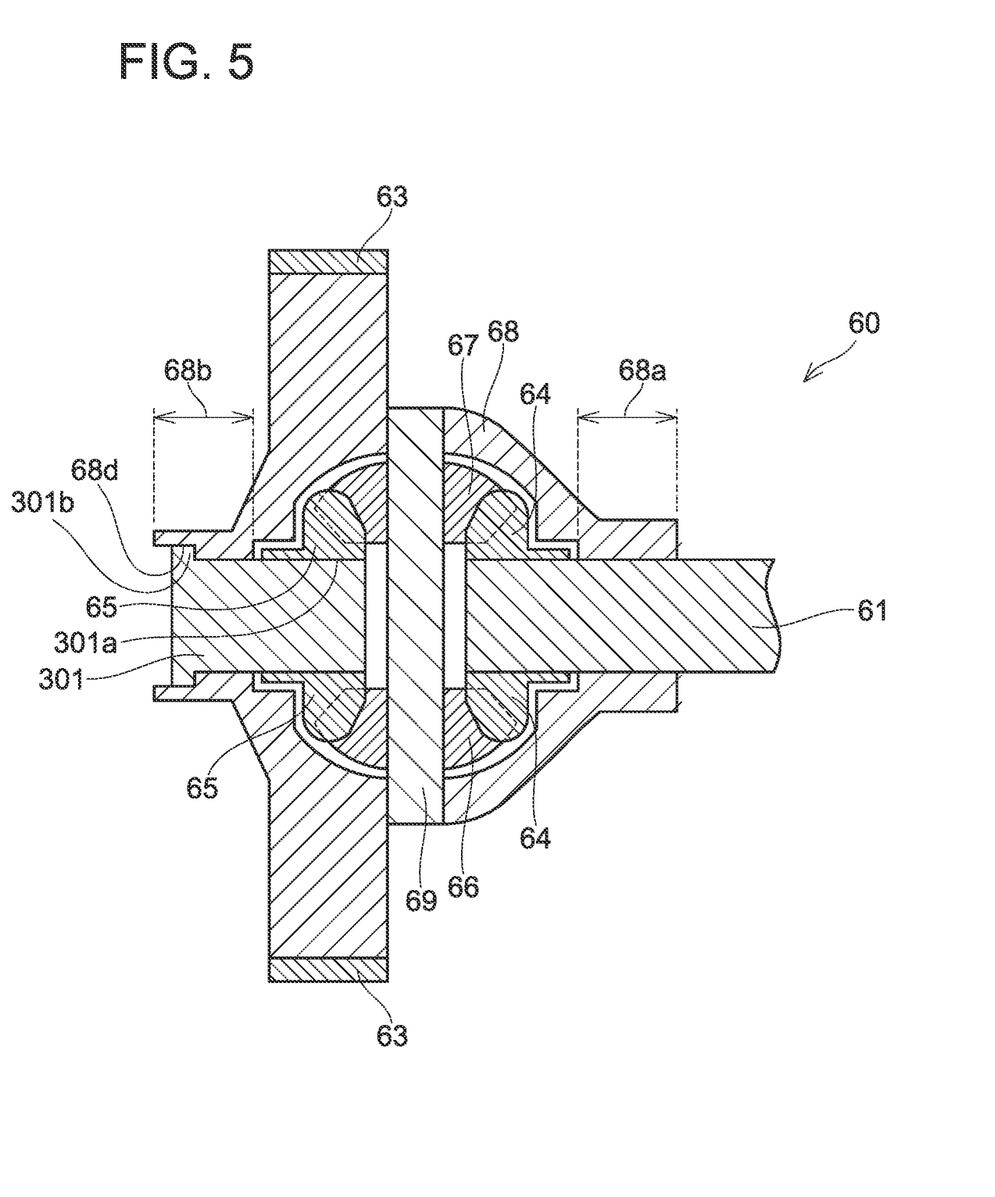
FIG. 5 is a cross-sectional schematic view of a differential gear mechanism 60 of a third embodiment.

In a third embodiment, a configuration in which the second side gear 65 and the ring gear 63 are fixed to each other in the differential gear mechanism 60 will be described. FIG. 5 shows a schematic cross-sectional view of the differential gear mechanism 60 in the third embodiment. The same reference signs are given to parts identical to those in the first embodiment and explanations thereof are omitted. In addition, parts unique to the third embodiment are distinguished by giving them reference signs in the 300*s*.

In the third embodiment, the second side gear 65 is fixed to the differential gear case 68. How to fix the second side gear 65 to the differential gear case 68 may vary. In the example shown in FIG. 5, a jig 301 is used.

A specific explanation will be given. The differential gear case 68 includes a guide portion 68*b*. The guide portion 68*b* is a member having a substantially cylindrical shape into which a second rotation shaft 62 is inserted. A fitting portion 68*d* is defined in the inner wall surface of the guide portion 68*b*. The jig 301 includes a fitting portion 301*a* formed on the distal end and a fitting portion 301*b* formed on the base end. The fitting portion 301*a* is fitted to the second side gear 65. The fitting portion 301*b* is fitted into the fitting portion 68*d* of the guide portion 68*b*. Due to this, the second side gear 65 can be fixed to the differential gear case 68.

How the fitting portion 301*a* is fitted to the second side gear 65 and how the fitting portion 301*b* is fitted to the fitting portion 68*d* are not limited and may be vary. For example, the fitting may be realized by a key and key groove. Alternatively, the fitting may be realized by fastening using a nut and/or the like.

Effects

When the driving force is inputted to the first side gear 64, the jig 301 suppresses the second side gear 65 from slipping. As a result, it is possible to rotate the first rotation shaft 61 and the differential gear case 68 together.

The first rotation shaft 61 can be fixed to the differential gear case 68 only by preparing the jig 301 and arranging it within the guide portion 68*b*. Since no special processing is required for the differential gear mechanism 60, the manufacturing cost of the wind power generation device 1 can be reduced.

Variant

A member to which the second side gear 65 is fixed may not be limited to the differential gear case 68 but may be different. For example, the second side gear 65 may be fixed to an inner wall of a case (not shown) in which the differential gear mechanism 60 is housed. In this case, the fitting portion 301b of the jig 301 can be fitted to a fitting portion of the inner wall of the case.

Fourth Embodiment

Figure 6:
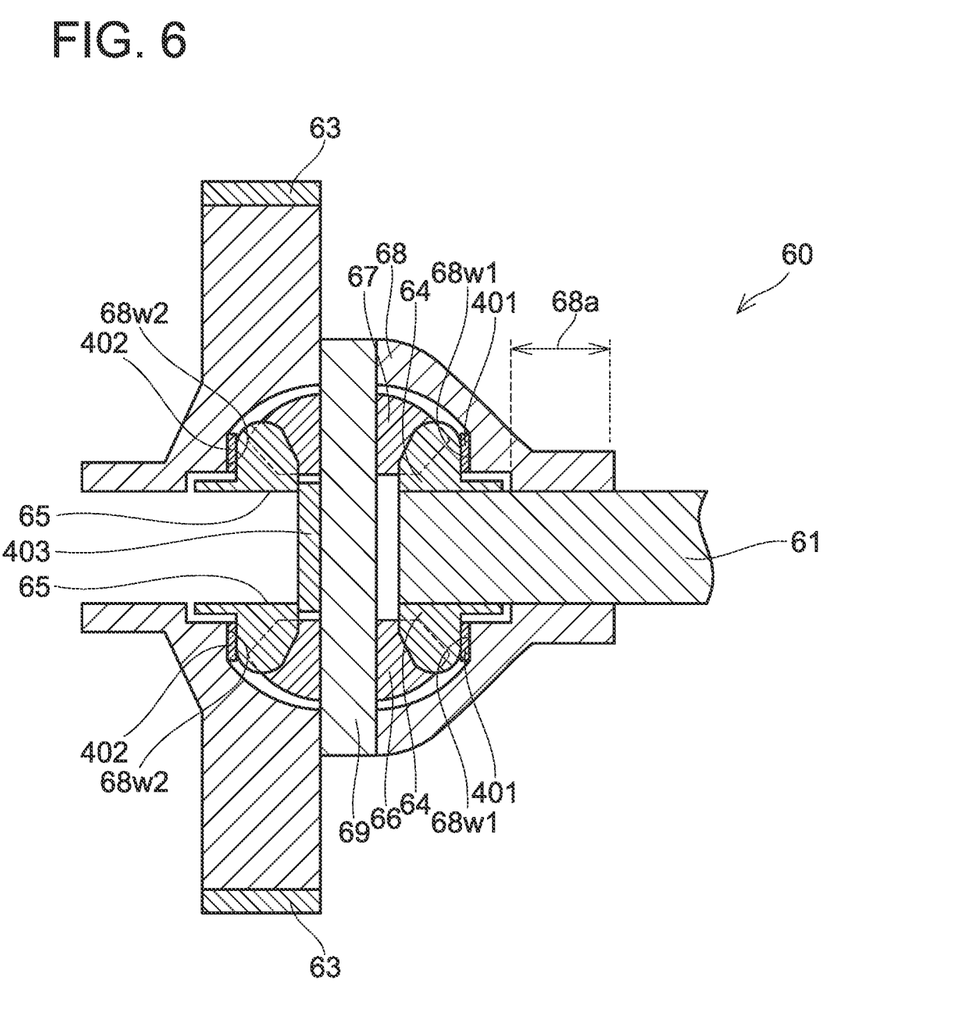
FIG. 6 is a cross-sectional schematic view of a differential gear mechanism 60 of a fourth embodiment.

In a fourth embodiment, a configuration in which the first side gear 64 and the second side gear 65 are fixed to the ring gear 63 in the differential gear mechanism 60 will be described. FIG. 6 shows a schematic cross-sectional view of the differential gear mechanism 60 of the fourth embodiment. The same reference signs are given to parts identical to those in the first embodiment and explanations thereof are omitted. In addition, parts unique to the fourth embodiment are distinguished by giving them reference signs in the 400s.

In the fourth embodiment, the first side gear 64 and the second side gear 65 are fixed to the differential gear case 68. How they are fixed may vary. In the example shown in FIG. 6, shims 401 and 402 and a spring mechanism 403 are used. A specific explanation will be given. The differential gear case 68 includes a first inner wall 68w1 and a second inner wall 68w2. The first inner wall 68w1 is a wall facing the first side gear 64 in the axial direction of the first rotation shaft 61. The second inner wall 68w2 is a wall facing the second side gear 65 in the axial direction of the first rotation shaft 61. The first inner wall 68w1 is in contact with the first side gear 64 via the shim 401. The second inner wall 68w2 is in contact with the second side gear 65 via the shim 402. The shims 401 and 402 are members to increase a frictional coefficient between parts. The spring mechanism 403 is arranged between the second side gear 65 and the pinion shaft 69. The spring mechanism 403 is a mechanism that pushes the second side gear 65 toward the second inner wall 68w2. Due to this, a frictional force generated by the shim 402 can further be increased.

The first side gear 64 and the first inner wall 68w1 can be fixed by the high frictional force generated by the shim 401. The second side gear 65 and the second inner wall 68w2 can be fixed by the high frictional force generated by the shim 402 and the spring mechanism 403. Consequently, it is possible to rotate the first rotation shaft 61 and the differential gear case 68 together.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

Variants

How the first side gear 64 and the second side gear 65 are fixed to the differential gear case 68 may be different. For example, they may be fixed by welding.

How the first rotation shaft 61 is fixed to the differential gear case 68 may be different. For example, the end of the first rotation shaft 61 may be fitted to the pinion shaft 69.

The first side gear 64 and the second side gear 65 may be fixed to each other. For example, the end of the first rotation shaft 61 may be extended to reach the second side gear 65.

Both the first side gear 64 and the second side gear 65 may then be fixed to the first rotation shaft 61. This also allows the first rotation shaft 61 and the ring gear 63 to rotate together.

To implement the technique herein, the differential gear mechanism 60 only needs to include at least the ring gear 63 and the differential gear case 68. Therefore, the first side gear 64, the second side gear 65, the pinion gears 66 and 67, and the pinion shaft 69 may be omitted. In this case, the first rotation shaft 61 may be fixed to the differential gear case 68.

What is claimed is:

1. A power generation device comprising:
   a blade;
   a first rotation shaft;
   a differential gear mechanism; and
   a first motor generator,
   wherein the differential gear mechanism comprises:
      a pair of a first side gear and a second side gear; and
      a first ring gear connecting the first side gear and the second side gear to the first motor generator,
   wherein the first side gear is fixed to one end of the first rotation shaft and the blade is connected to the other end of the first rotation shaft, and
   in the differential gear mechanism, at least two of the first side gear, the second side gear and the first ring gear are fixed to each other such that they are not able to rotate relative to each other.

2. The power generation device according to claim 1, wherein
   the differential gear mechanism further comprises:
      a plurality of pinion gears connecting the first side gear and the second side gear to each other; and
      a case integrated with the first ring gear, the case housing the first side gear, the second side gear, and the plurality of pinion gears, and
   wherein the second side gear is fixed to the case.

3. The power generation device according to claim 1, wherein
   the power generation device further comprises a planetary gear mechanism and a second motor generator,
   the planetary gear mechanism comprises a sun gear, a second ring gear, and a planetary carrier,
   the first motor generator is connected to the sun gear, and
   the blade and the second motor generator are connected to the second ring gear.

4. The power generation device according to claim 1, wherein
   the differential gear mechanism further comprises:
      a plurality of pinion gears connecting the first side gear and the second side gear to each other; and
      a case integrated with the first ring gear, the case housing the first side gear, the second side gear, and the plurality of pinion gears, and
   wherein the first rotation shaft or the first side gear is fixed to the case.

5. The power generation device according to claim 4, wherein
   the case includes a guide portion having a cylindrical shape coaxial with the first rotation shaft, the guide portion covering a circumference of the first rotation shaft, and
   an inner wall surface of the guide portion facing the first rotation shaft is fixed to the first rotation shaft.

* * * * *